(12) United States Patent
Ogawa et al.

(10) Patent No.: US 8,733,385 B2
(45) Date of Patent: May 27, 2014

(54) CLEANER FOR INSIDE OF WATER TANK

(75) Inventors: Soichi Ogawa, Tokyo (JP); Yutaka Yoshida, Tokyo (JP)

(73) Assignee: Soichi Ogawa, Tokyo (JP)

( * ) Notice: Subject to any disclaimer, the term of this patent is extended or adjusted under 35 U.S.C. 154(b) by 218 days.

(21) Appl. No.: 13/002,405

(22) PCT Filed: Jul. 14, 2009

(86) PCT No.: PCT/JP2009/062705
§ 371 (c)(1),
(2), (4) Date: Jan. 3, 2011

(87) PCT Pub. No.: WO2010/016362
PCT Pub. Date: Feb. 11, 2010

(65) Prior Publication Data
US 2011/0120570 A1    May 26, 2011

(30) Foreign Application Priority Data

Aug. 8, 2008  (JP) ................................ 2008-205807
Mar. 2, 2009  (JP) ................................ 2009-047726

(51) Int. Cl.
*F16L 43/00*  (2006.01)
(52) U.S. Cl.
USPC ...... 137/148; 137/128; 137/140; 137/565.15; 137/565.25; 119/232; 119/247; 119/264; 417/443
(58) Field of Classification Search
USPC .................. 137/146–150, 140, 128, 565.01, 137/565.11, 565.12, 565.15, 565.25; 222/204, 209, 213, 130; 119/227, 232, 119/247, 264; 417/374, 443; 210/167.25
See application file for complete search history.

(56) References Cited

U.S. PATENT DOCUMENTS

| | | | | |
|---|---|---|---|---|
| 136,934 A | * | 3/1873 | Nichols | 137/150 |
| 151,382 A | * | 5/1874 | Grant | 137/150 |
| 232,525 A | * | 9/1880 | Manwaring | 137/150 |
| 238,136 A | * | 2/1881 | Manwaring | 137/150 |
| 383,153 A | * | 5/1888 | Siersdorfer | 137/150 |
| 407,971 A | * | 7/1889 | Siersdorfer | 137/150 |
| 1,582,399 A | * | 4/1926 | Helander | 137/150 |
| 2,325,210 A | * | 7/1943 | Swihart | 222/207 |
| 3,158,104 A | * | 11/1964 | Hutchinson | 417/478 |
| 3,225,930 A | * | 12/1965 | Willinger | 210/167.23 |

(Continued)

FOREIGN PATENT DOCUMENTS

| | | |
|---|---|---|
| CN | 2110735 U | 7/1992 |
| CN | 2857471 Y | 1/2007 |

(Continued)

*Primary Examiner* — Craig Schneider
*Assistant Examiner* — Craig J Price
(74) *Attorney, Agent, or Firm* — Arent Fox LLP

(57) ABSTRACT

A cleaner for the inside of a water tank utilizing a siphoning action is provided, in which the interior of a water passage (24) between an upstream-side one-way valve (Vu) and a downstream-side one-way valve (Vd) is pressurized or depressurized by a pressing operation of a suction operation tool (A) provided in a bent connecting part between a main body portion (1) and a grip portion (2) of a suction pipe (P), and water-tank water of the main body portion (1) is sucked into the suction pipe (P). This enables waste material such as leftover food within water-tank water to be sucked up together with dirty water by a very simple operation.

11 Claims, 9 Drawing Sheets

(56) References Cited

U.S. PATENT DOCUMENTS

| | | | |
|---|---|---|---|
| 3,650,473 A * | 3/1972 | Malone | 239/333 |
| 3,734,853 A * | 5/1973 | Horvath | 210/167.25 |
| 6,412,528 B1 * | 7/2002 | Alex et al. | 137/147 |
| 6,499,432 B2 * | 12/2002 | Ogawa | 119/264 |
| 6,527,202 B1 * | 3/2003 | Tseng | 222/209 |
| 6,926,026 B1 * | 8/2005 | Burgoyne | 137/149 |
| 6,948,920 B2 * | 9/2005 | Stoner et al. | 417/443 |
| 2002/0046711 A1 | 4/2002 | Ogawa | |
| 2007/0051320 A1 * | 3/2007 | Yen | 210/167.23 |

FOREIGN PATENT DOCUMENTS

| | | |
|---|---|---|
| JP | 368325 Z2 | 9/1950 |
| JP | 55-39370 | 3/1980 |
| JP | 60-62261 U | 5/1985 |
| JP | 60-185000 A | 9/1985 |
| JP | 4075547 A | 3/1992 |
| JP | 2000-209978 A | 8/2000 |

* cited by examiner

CLEANER FOR INSIDE OF WATER TANK

TECHNICAL FILED

The present invention relates to an improvement of a cleaner for the inside of a water tank in which water-tank water inside a water tank for breeding aquarium fish, in particular dirty water-tank water in a bottom part inside the water tank, can be sucked up and drained outside the water tank.

BACKGROUND ART

Conventionally, when breeding and rearing aquarium fish such as goldfish, tropical fish, or marine fish inside a water tank, the water tank is provided with an internal or external filter device equipped with an air pump or a submersible pump, and water-tank water inside the water tank is filtered by forcibly circulating it to the filter device by driving the pump, but since it is impossible to obtain water quality that is necessary and sufficient for breeding and rearing aquarium fish just by filtration with such a filter device, it is necessary to regularly change water-tank water inside the water tank. A cleaner for the inside of a water tank in which water is changed by sucking up water-tank water together with waste material such as fish excrement or leftover food is conventionally known (ref. e.g. Patent Publication 1 below). Patent Publication 1: Japanese Patent Application Laid-open No. 2000-209978

DISCLOSURE OF INVENTION

Problems to be Solved By the Invention

In the arrangement of Patent Publication 1 above, water-tank water inside the water tank is sucked outside together with waste material such as settled fish excrement or leftover food by means of a suction pipe utilizing a siphoning action; the suction pipe has a linear main body portion having open extremity and a grip portion bendingly connected to the base of the main body portion, and the suction pipe is provided with two one-way valves permitting the flow of water in one direction from the upstream side to the downstream side. This cleaner is arranged so as to efficiently suck up and drain to the outside water-tank water inside the water tank, in particular waste material such as fish excrement or leftover food, which has settled in a bottom part thereof, together with water-tank water.

However, this conventional cleaner has the problem that when water is sucked into the suction pipe by utilizing a siphoning action, it is necessary for an operator to put the suction pipe into water-tank water of the water tank by gripping it and then carry out a repeated operation of vertical movement of the suction pipe in its longitudinal direction; this operation is not only cumbersome, but it also requires experience, and it is difficult for a child to carry out the operation.

The present invention has been accomplished in the light of such circumstances, and it is an object thereof to provide a novel cleaner for the inside of a water tank in which the above-mentioned operation is not required, and water can be sucked up very simply and easily even by a child by applying a siphoning action to a suction pipe.

Means for Solving the Problems

In order to attain the above object, according to a first aspect of the present invention, there is provided a cleaner for the inside of a water tank in which water-tank water within a water tank is sucked up by a siphoning action and drained outside the water tank, the cleaner comprising a suction pipe formed from a linear main body portion and a grip portion bendingly connected to the main body portion, a flexible water-guiding pipe connected to the outer end of the suction pipe, an upstream-side one-way valve provided at an appropriate place within the main body portion and only permitting the flow of water from the suction pipe to the water-guiding pipe, a downstream-side one-way valve provided within the grip portion and only permitting the flow of water from the suction pipe to the water-guiding pipe, and a suction operation tool provided in a bent connecting part between the main body portion and the grip portion and pressurizing or depressurizing the interior of a water passage between the upstream-side one-way valve and the downstream-side one-way valve.

In order to attain the above object, according to a second aspect of the present invention, in addition to the first aspect, the suction operation tool is formed from an operation tube connected so as to communicate with the interior of the water passage and provided substantially parallel to the main body portion, a press button slidably fitted into the operation tube via a seal ring and having an outer end thereof projecting outside the operation tube, and a return spring provided within the operation tube and urging the press button toward the outside.

In order to attain the above object, according to a third aspect of the present invention, there is provided a cleaner for the inside of a water tank in which water-tank water within a water tank is sucked up by a siphoning action and drained outside the water tank, the cleaner comprising a suction pipe formed from a linear main body portion and a grip portion bendingly connected to the main body portion, a flexible water-guiding pipe connected to the outer end of the suction pipe, an upstream-side one-way valve provided at an appropriate place within the main body portion and only permitting the flow of water from the suction pipe to the water-guiding pipe, a downstream-side one-way valve provided within the grip portion and only permitting the flow of water from the suction pipe to the water-guiding pipe, and a suction operation tool provided above the suction pipe and pressurizing or depressurizing the interior of a water passage between the upstream-side one-way valve and the downstream-side one-way valve, the suction operation tool being formed from an operation tube provided above an upper wall of the suction pipe and having an operation chamber positioned above the water passage within the suction pipe, a press button slidably fitted into the operation chamber via a seal ring and projecting outside the operation tube, and a return spring provided within the operation tube and urging the press button toward the outside.

Effects of the Invention

In accordance with each aspect of the present invention, in the cleaner for the inside of a water tank, by just gripping the suction pipe, whose main body portion is placed inside the water tank, with one hand and pressing the suction operation tool, a siphoning action can be established for the suction pipe, and anybody can simply and easily suck outside water-tank water together with waste material such as leftover food or fish excrement.

Furthermore, in accordance with the second aspect of the present invention, since the suction operation tool is connected so as to communicate with the interior of the water passage and is provided substantially parallel to the main body portion of the suction pipe, the operational direction of the suction operation tool coincides with the direction of suction of water by the suction pipe, and the operation of cleaning waste material such as leftover food or fish excrement can be carried out quickly and efficiently.

Moreover, in accordance with the third aspect of the present invention, since the suction operation tool is provided above the upper wall of the suction pipe, and the operation chamber thereof is positioned above the water passage within the suction pipe, fine foreign matter such as gravel that is sucked up together with the water-tank water within the suction pipe does not enter the interior of the operation chamber of the suction operation tool and bite into the seal ring, and smooth operation of the suction operation tool can be guaranteed.

EXPLANATION OF REFERENCE NUMERALS AND SYMBOLS

Figure 1:
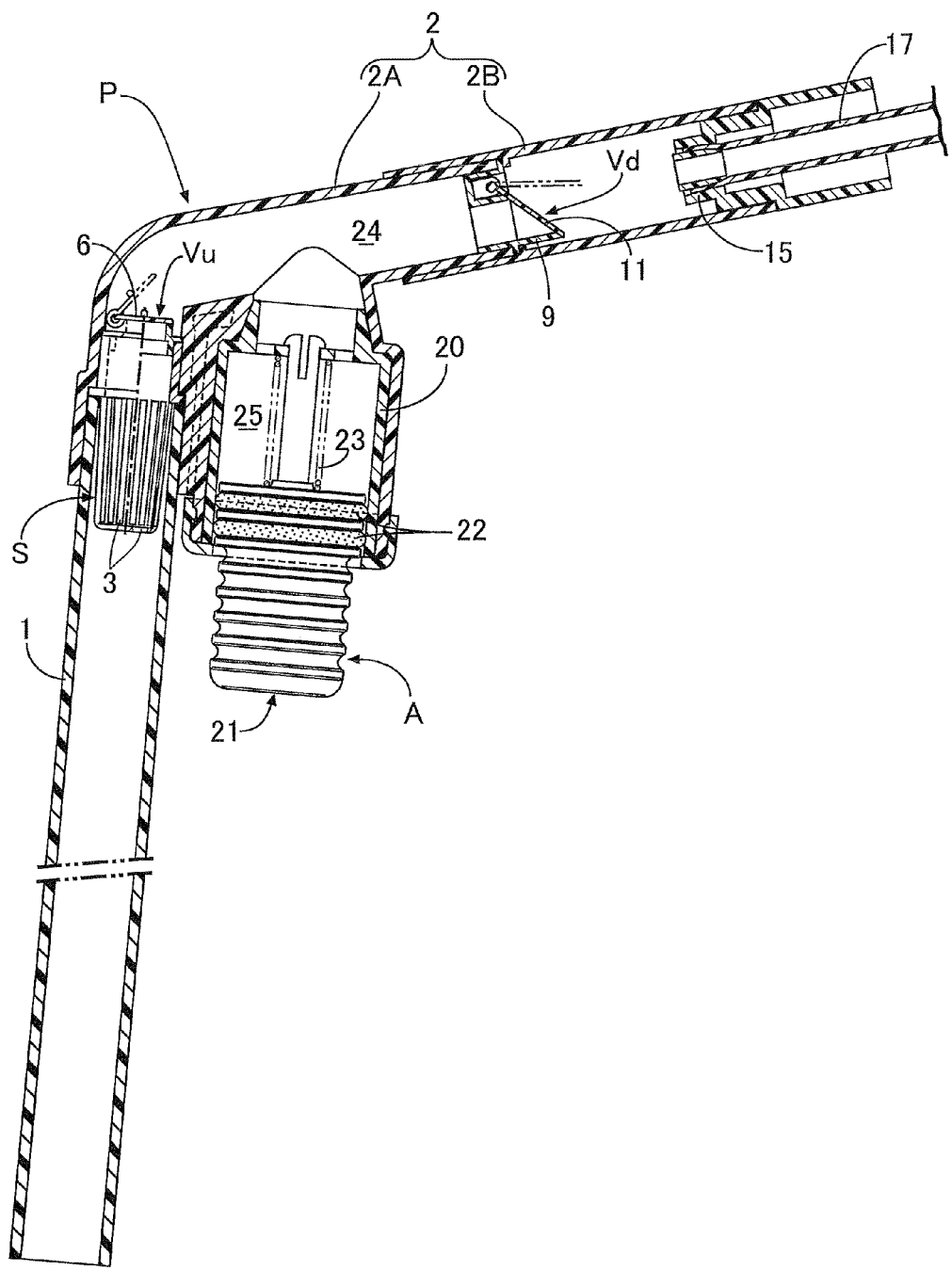
FIG. 1 is a vertical sectional side view of a cleaner for the inside of a water tank (first embodiment).

1 Main body portion
2 Grip portion
17 Water-guiding pipe
20 Operation tube
21 Press button
22 Seal ring
23 Return spring
24 Water passage
25 Operation chamber
A Suction operation tool
P Suction pipe
V Water tank
Vu Upstream-side one-way valve
Vd Downstream-side one-way valve

BEST MODE FOR CARRYING OUT THE INVENTION

Modes for carrying out the present invention are explained below by reference to embodiments of the present invention shown in the attached drawings.

Embodiment 1

A first embodiment of the present invention is now explained by reference to FIGS. 1 to 6.

In FIGS. 1 to 5, a suction pipe P forming a main body part of a cleaner for the inside of a water tank is made with a transparent rigid synthetic resin material, and is formed in a dog-leg shape when viewed from the side from a straight cylindrical main body portion 1 that has an open extremity and is formed with a length that reaches to the bottom of a water tank V from the outside of the water tank V and a grip portion 2 bent so as to be communicatingly connected to the base end, that is, the downstream end, of the main body portion 1. The grip portion 2 is formed by removably and watertightly connecting an elbow pipe 2A and a straight pipe 2B. An angle formed by a central line L1 of the main body portion 1 and a central line L2 of the grip portion 2 is an obtuse angle, that is, about 105°, and this makes it difficult for the grip portion 2 to abut against an edge of the water tank V when the cleaner for the inside of a water tank is used, thus improving the operability.

A frustoconical strainer S having a large number of slits 3 made therein is provided in the interior of a part where the main body portion 1 and the grip portion 2 of the suction pipe P are connected, and this strainer S permits the free passage of dirty water contaminated by fine waste material such as leftover food or fish excrement but prevents the passage of coarse waste material such as dead leaves or stones. An upstream-side one-way valve Vu is provided at the rear end, that is, an exit 4, of the strainer S. This upstream-side one-way valve Vu is formed from a valve hole 5 communicating with the exit 4 of the strainer S, and a valve body 6 that is connected by a hinge 7 to one side of the valve hole 5 so as to open and close the valve hole 5, and operates so as to permit the flow of water that has been sucked into the suction pipe P and passed through the strainer S but prevent the backflow thereof.

Furthermore, a downstream-side one-way valve Vd is provided within a downstream side section of the suction pipe P, which is on the downstream side relative to the upstream-side one-way valve Vu, that is, within an intermediate section of the grip portion 2. This downstream-side one-way valve Vd is fixed within the grip portion 2 and is formed from a valve seat body 9 having a valve hole 10 opening therein, and a valve body 11 that is connected by a hinge 12 to the valve seat body 9 so as to open and close the valve hole 10. The valve hole 10 is formed in an elliptical shape by obliquely cutting a cylindrical body, the valve body 11 for opening and closing the valve hole 10 is also formed in an elliptical shape and connected by the hinge 12 to an upper part side of the valve seat body 9 (when the cleaner is in use), and opening and closing of the downstream-side one-way valve Vd are thereby carried out smoothly by means of the hydraulic pressure of water flowing within the suction pipe P.

A connection pipe 15 is integrally connected to the interior of the downstream end of the grip portion 2, and this connection pipe 15 is connected to the upstream end of a water-guiding pipe 17. The water-guiding pipe 17 is formed from a flexible transparent pipe such as a vinyl chloride pipe.

Figure 5:
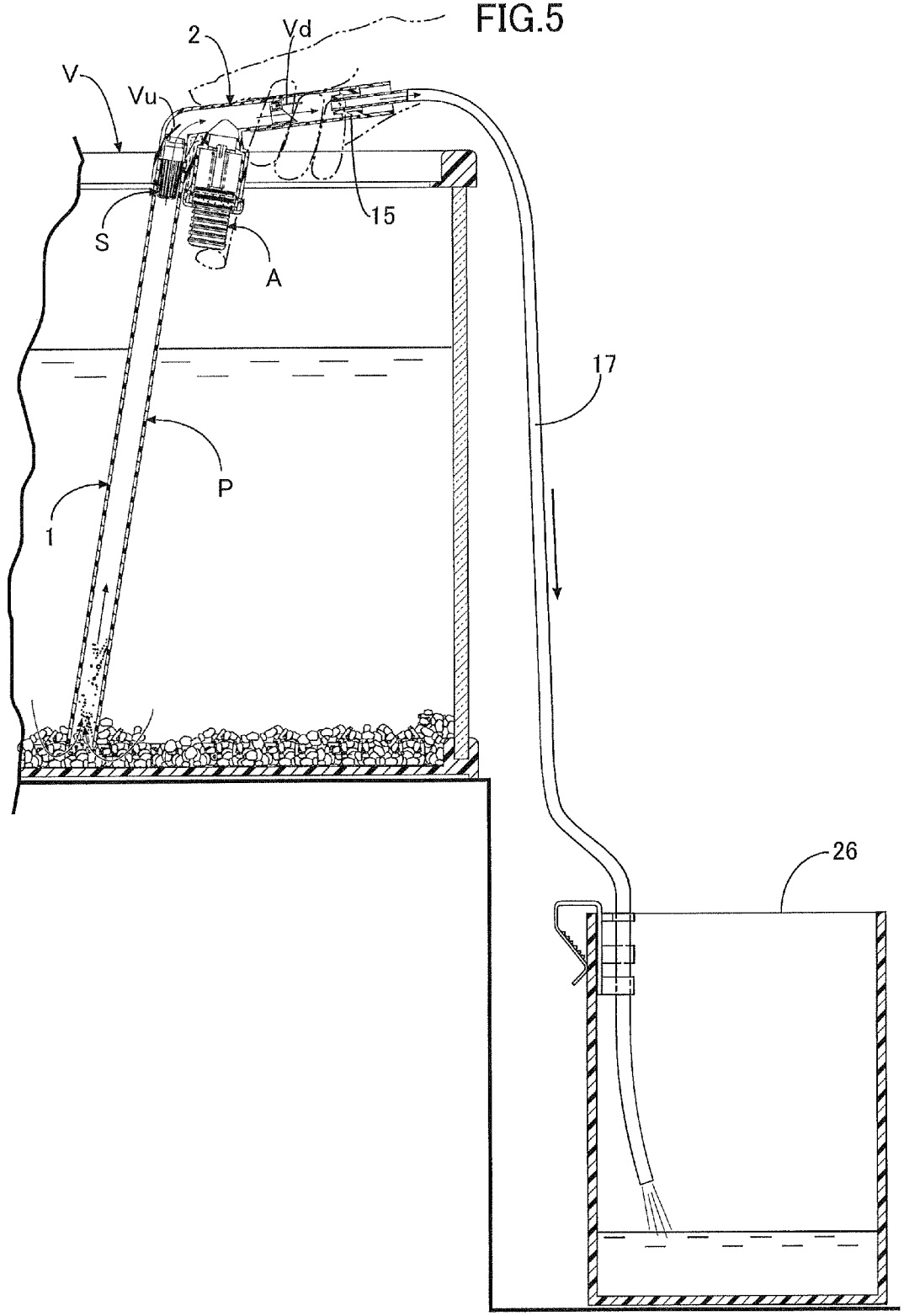
FIG. 5 is a diagram showing a state in which the cleaner for the inside of a water tank is in use (first embodiment).

As shown in FIG. 5, the water-guiding pipe 17 is formed in a length that enables the downstream end of the water-guiding pipe 17 to reach beneath the water level of the water tank V when the extremity of the suction pipe P faces the bottom part within the water tank V, that is, a length that can give a siphoning action for the cleaner, which is described later.

Figure 2:
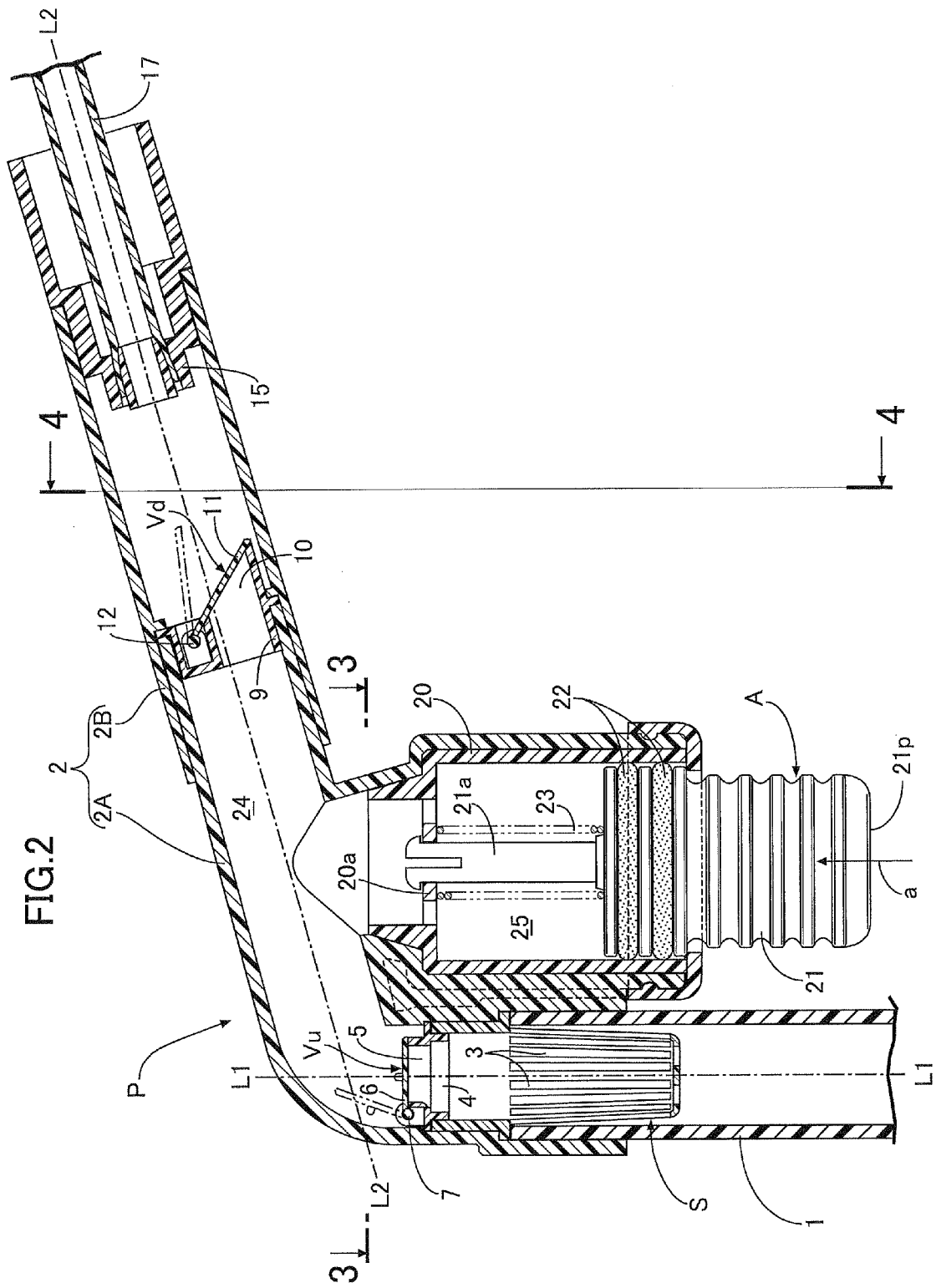
FIG. 2 is an enlarged view of an essential part of FIG. 1 (first embodiment).
Figure 3:
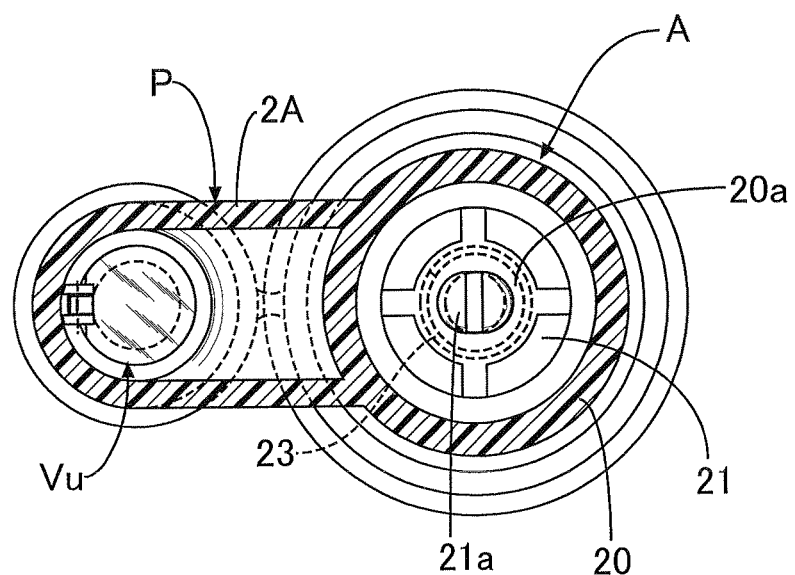
FIG. 3 is a sectional view along line 3-3 in FIG. 2 (first embodiment).
Figure 4:
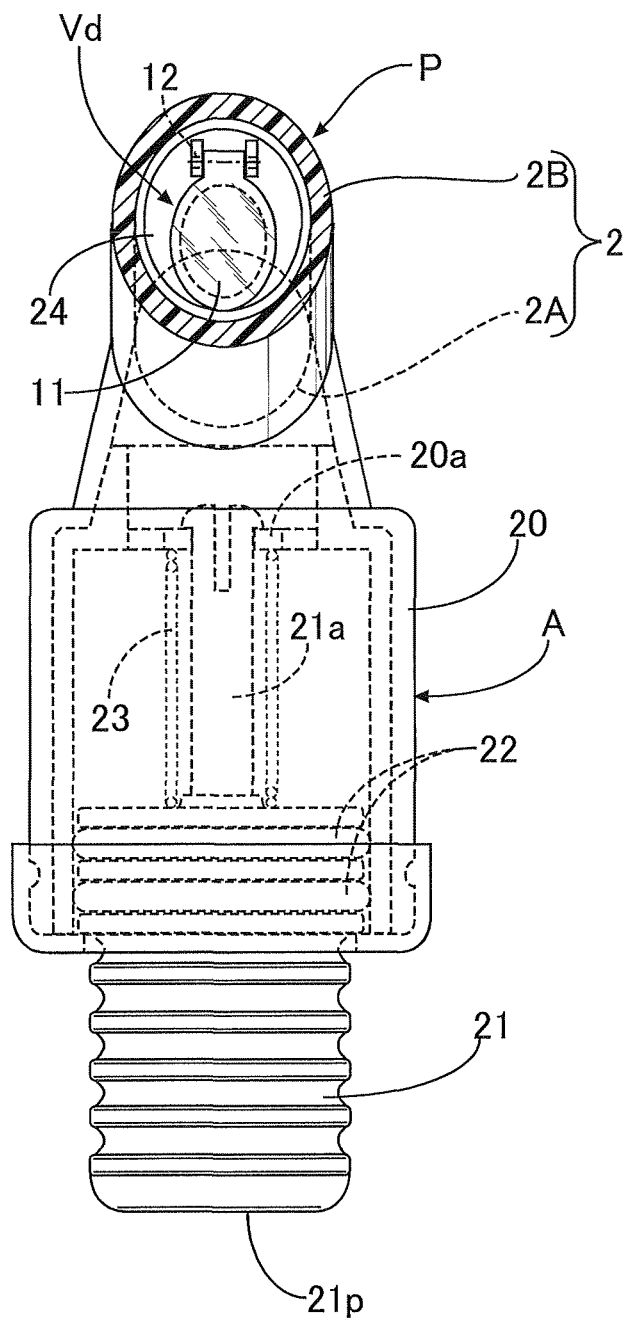
FIG. 4 is a sectional view along line 4-4 in FIG. 2 (first embodiment).

As shown in FIG. 2, between the main body portion 1 and the grip portion 2 of the suction pipe P, a suction operation tool A for sucking water into the suction pipe P is provided in a bent connecting part thereof. This suction operation tool A is formed from a cylindrical operation tube 20 that is provided integrally with the bent connecting part of the main body portion 1 and the grip portion 2, is provided parallel to the main body portion 1, and has an operation chamber 25 formed in the interior thereof, a press button 21 that is slidably fitted, via a seal ring 22, into the operation chamber 25 from the outer end of the opening of the operation tube 20, and a return spring 23, which is a coil spring provided in a compressed state between the inner end of the press button 21 and the base end of the operation tube 20 within the operation tube 20 and urging the press button 21 so that it projects outside, a guide rod 21a fixed to the inner end of the press button 21 slidably extending through an inner end wall 20a of the operation tube 20. The interior of the operation chamber 25 of the operation tube 20 communicates with a water passage 24 between the upstream-side and downstream-side one-way valves Vu and Vd within the suction pipe P, and a press face 21p is formed at the outer end of the press button 21. When the press button 21 is pressed in the direction shown by arrow a in FIG. 2, the press button 21 compresses the return spring 23 and moves inward within the operation chamber 25 so as to pressurize the water passage 24, thus closing the upstream-side one-way valve Vu and opening the downstream-side one-way valve Vd. When the pressing force on the press button 21 is released, the press button 21 is moved outward by the resilient force of the return spring 23 and returns to its original position (the position in FIG. 2), and the water passage 24 is depressurized, thereby opening the upstream-side one-way valve Vu and closing the downstream-side one-way valve Vd at the same time.

The operation of the first embodiment is now explained by reference to FIGS. 5 and 6.

(1) First, as shown in FIG. 5, after the open free end of the water-guiding pipe 17 is put into the interior of a recovery vessel 26 such as a bucket, the main body portion 1 of the suction pipe P is immersed in a vertical direction in water-tank water inside the water tank V by gripping the grip portion 2. In this process, water inside the water tank V enters part way up the interior (water level) of the suction pipe P, both the upstream-side and downstream-side one-way valves Vu and Vd are opened, part of the air within the suction pipe P is discharged into the water-guiding pipe 17, and the air is released to the outside.

Figure 6:
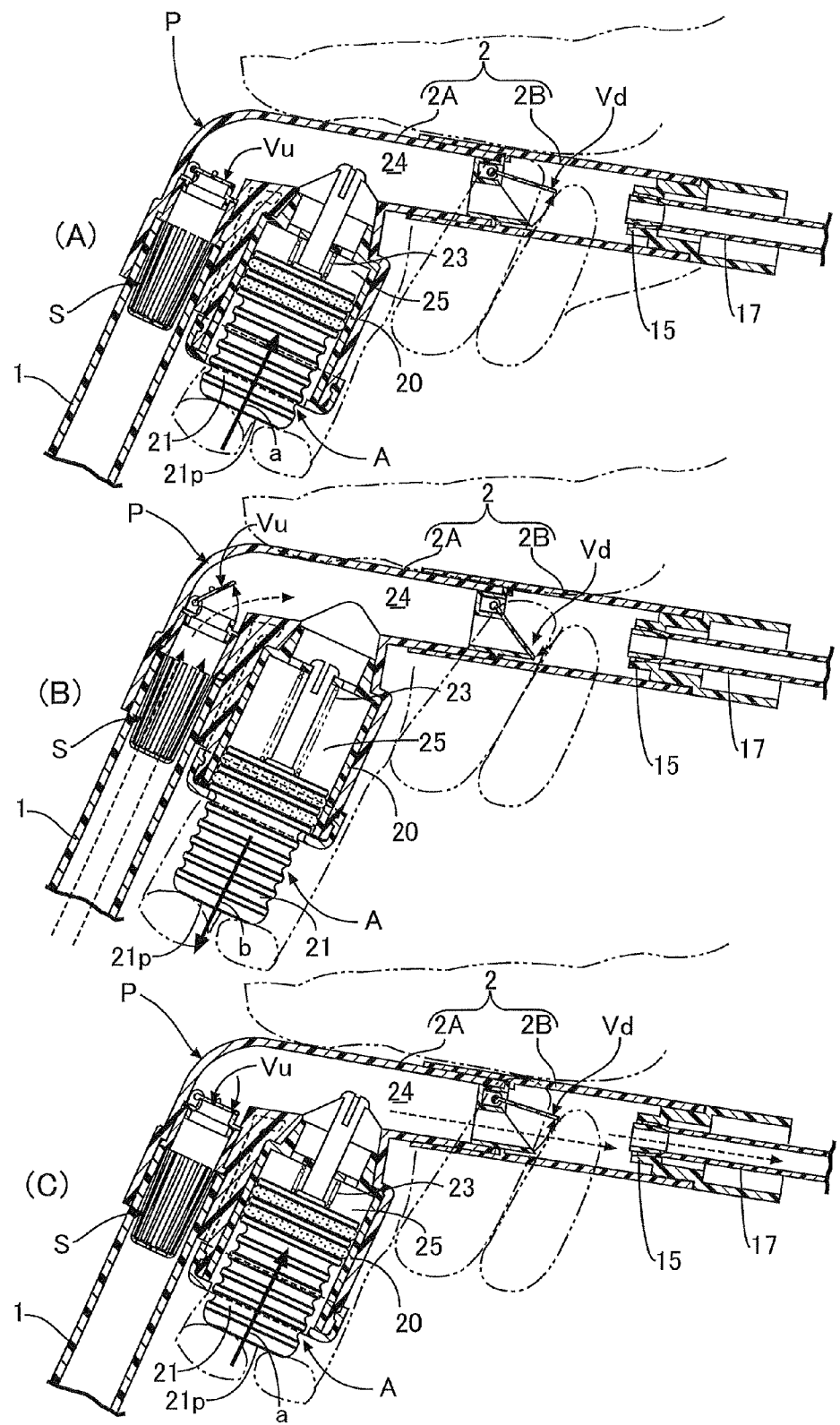
FIG. 6 is a sectional view showing operation of the cleaner for the inside of a water tank (first embodiment).

(2) Subsequently, as shown in FIG. 6 (A), while gripping the grip portion 2, when the press face 21p of the press button 21 of the suction operation tool A is pressed with a fingertip (pulling the press button 21) as shown by arrow a, the press button 21 moves inward. This reduces the volume within the operation chamber 25 and the interior of the water passage 24 is pressurized, thus closing the upstream-side one-way valve Vu and opening the downstream-side one-way valve Vd.

(3) Subsequently, as shown in FIG. 6 (B), when the pressure on the press button 21 is released, the press button 21 moves outward as shown by arrow b, the volume of the operation chamber 25 is increased, and the interior of the water passage 24 is depressurized, thus opening the upstream-side one-way valve Vu and closing the downstream-side one-way valve Vd.

(4) As shown in FIG. 6 (C), when again pressing the press button 21 as shown by arrow a, the interior of the water passage 24 is pressurized again, thus closing the upstream-side one-way valve Vu and opening the downstream-side one-way valve Vd.

(5) As hereinbefore described, by repeating operations (2) to (4) several times, water-tank water inside the water tank V is forcibly sucked into the suction pipe P by the pumping action generated within the operation chamber 25; thereafter, water flowing through the interior of the suction pipe P attains a continuous flow and water inside the water tank V is drained outside by means of a siphoning action without carrying out the above-mentioned operations.

After the operation of draining water by the siphoning action is established, as shown in FIG. 5, putting the upstream end of the suction pipe P, that is, the open free end, into gravel in the bottom part of the water tank V enables dirty water containing fine waste material such as leftover food or fish excrement to be sucked up and drained outside the water tank V through the suction pipe P and the water-guiding pipe 17. In this process, coarse waste material such as dead leaves contained in the dirty water is separated by means of the strainer S. The dirty water from which coarse waste material such as dead leaves has been separated and removed by the strainer S does not clog the upstream-side and downstream-side one-way valves Vu and Vd with waste material, and water can be smoothly sucked up and drained continuously.

When the suction force generated within the suction pipe P is large, fine particles such as gravel are sucked into the suction pipe P together with water-tank water, but in this case by pinching partway along the flexible water-guiding pipe 17 with the fingertips, the suction force is reduced, and the fine particles sucked into the suction pipe P are returned to the water tank V.

In the above-mentioned operations of sucking up and draining dirty water, since the operation tube 20 is provided substantially parallel to the main body portion 1 of the suction pipe P, the operational direction of the suction operation tool A coincides with the suction direction of water, it becomes easy to capture waste material in the bottom part of the water tank V, and this can be sucked up and drained together with dirty water quickly and efficiently.

Embodiment 2

A second embodiment of the present invention is now explained by reference to FIGS. 7 and 8.

Figure 7:
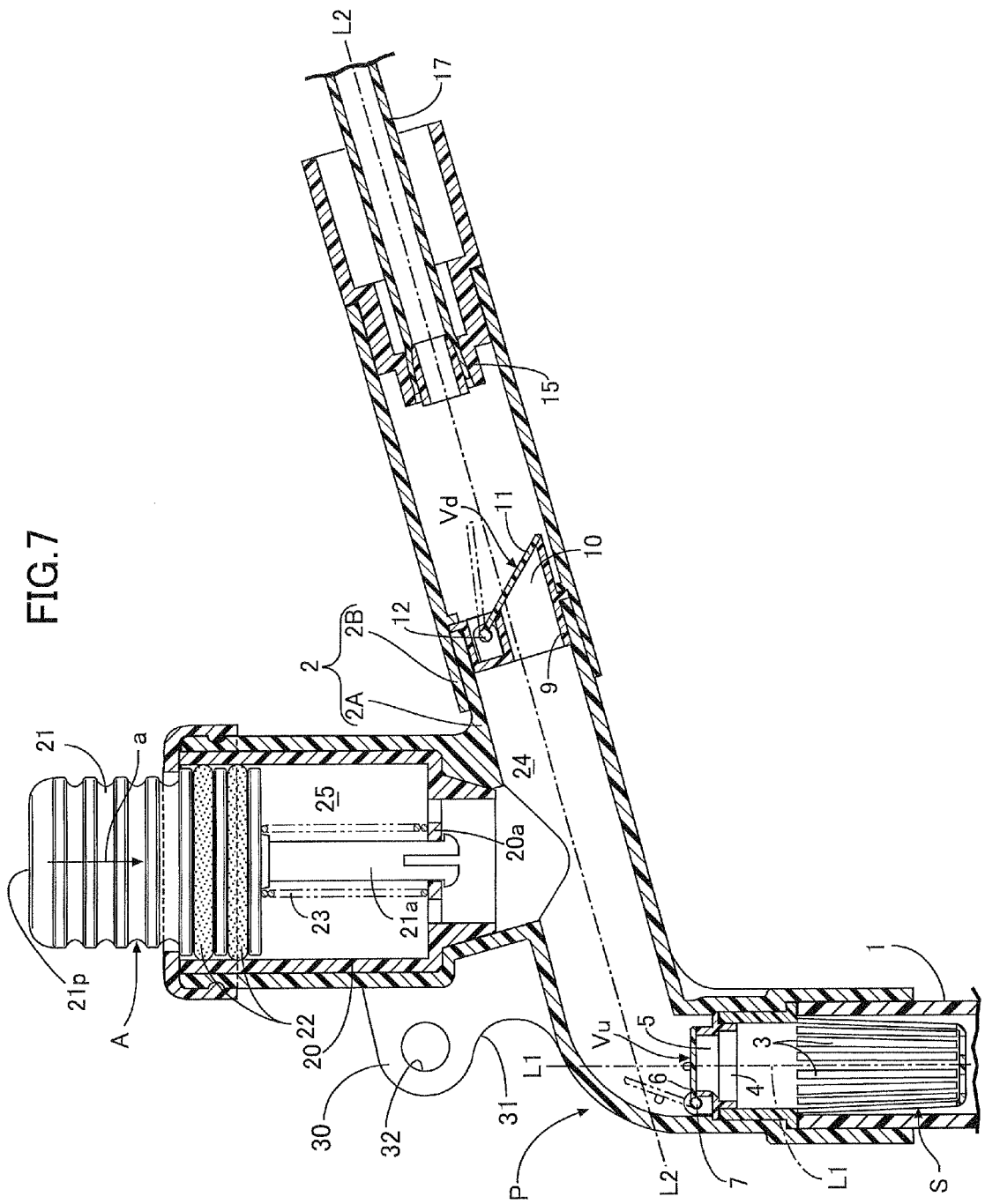
FIG. 7 is a vertical sectional side view of an essential part of a cleaner for the inside of a water tank (second embodiment).

The second embodiment is different from the first embodiment in terms of the position at which a suction operation tool A is mounted on a suction pipe P, as shown in FIG. 7, the suction operation tool A being provided in an upper part of the suction pipe P, that is, an upper wall of a grip portion 2. This suction operation tool A has the same structure as that of the first embodiment; an operation tube 20 is formed integrally with an upper face of the grip portion 2, this operation tube 20 extends upward substantially parallel to the main body portion 1, and an operation chamber 25 within the operation tube 20 is at a position outside and above a water passage 24 within the suction pipe P and communicates with the water passage 24. A press button 21 is slidably fitted via a seal ring 22 into the operation tube 20 from the open upper end thereof, and a press face 21p is formed on an upper face of the press button 21.

A fingerhold piece 30 is formed integrally so as to straddle the base of the operation tube 20 on the main body portion 1 side and the upper face of the grip portion 2, and an arc-shaped fingerhold recess 31 for an operator to rest a finger on is formed on an edge part of the fingerhold portion 30. Furthermore, a hanging hole 32 is opened in the fingerhold piece 30. When the cleaner is not in use, it may be hung down from an appropriate hanger by utilizing the hanging hole 32.

Figure 8:
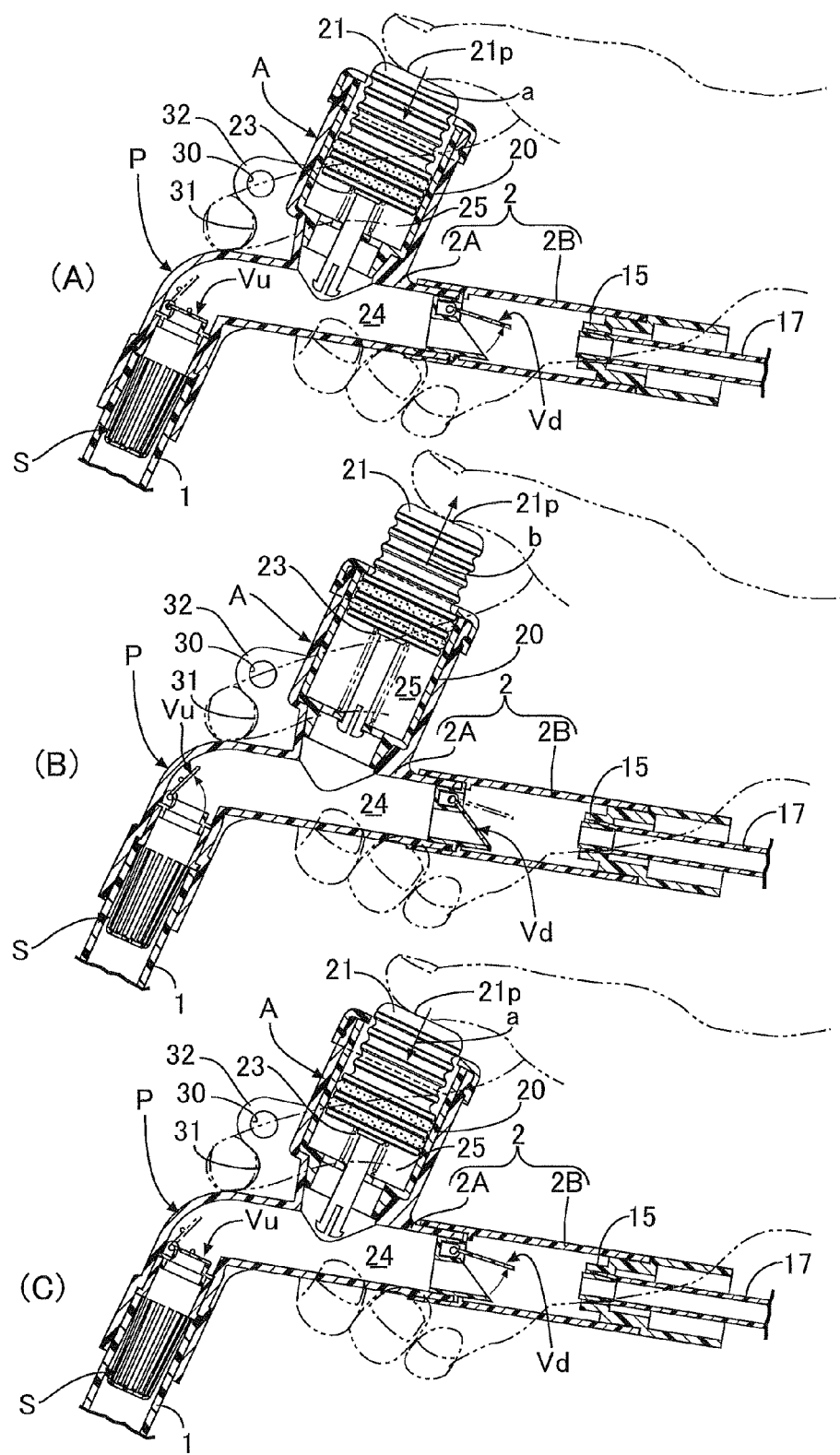
FIG. 8 is a sectional view showing operation of the cleaner for the inside of a water tank (second embodiment).

As shown in FIG. 8 (A), when an operator grips the grip portion 2, rests a finger on the fingerhold recess 31, and presses the press face 21p of the press button 21 downward with another finger as shown by arrow a, in the same manner as in the first embodiment, the inner volume of the operation chamber 25 decreases, and the interior of the water passage 24 is pressurized, thus closing an upstream-side one-way valve Vu and opening a downstream-side one-way valve Vd.

Subsequently, as shown in FIG. 8 (B), when pressure on the press button 21 is released, the press button 21 moves outward as shown by arrow b, the inner volume of the operation chamber 25 increases, and the interior of the water passage 24 is depressurized, thus opening the upstream-side one-way valve Vu and closing the downstream-side one-way valve Vd.

Subsequently, as shown in FIG. 8 (C), when the press button 21 is pressed again, the interior of the water passage 24 is pressurized again, thus closing the upstream-side one-way valve Vu and opening the downstream-side one-way valve Vd.

By repeating the operations above several times, water-tank water inside the water tank V is forcibly sucked into the suction pipe P by the pumping action generated in the operation chamber 25; thereafter, water flowing through the interior of the suction pipe P attains a continuous flow and water inside the water tank V is drained outside by means of a siphoning action without carrying out the above-mentioned operations.

In accordance with the second embodiment, since the suction operation tool A is at a position above the suction pipe P, and the operation chamber 25 is at a position outside the water passage 24 of the suction pipe P, in the suction pipe P, even if dirty water and fine foreign matter are sucked into the suction pipe P, there is no possibility of the foreign matter entering the operation chamber 25 and being caught between the seal ring 22 and the operation tube 20, and it is possible to guarantee smooth and appropriate operation of the suction operation tool A.

Modified Example of Embodiment 2

Figure 9:
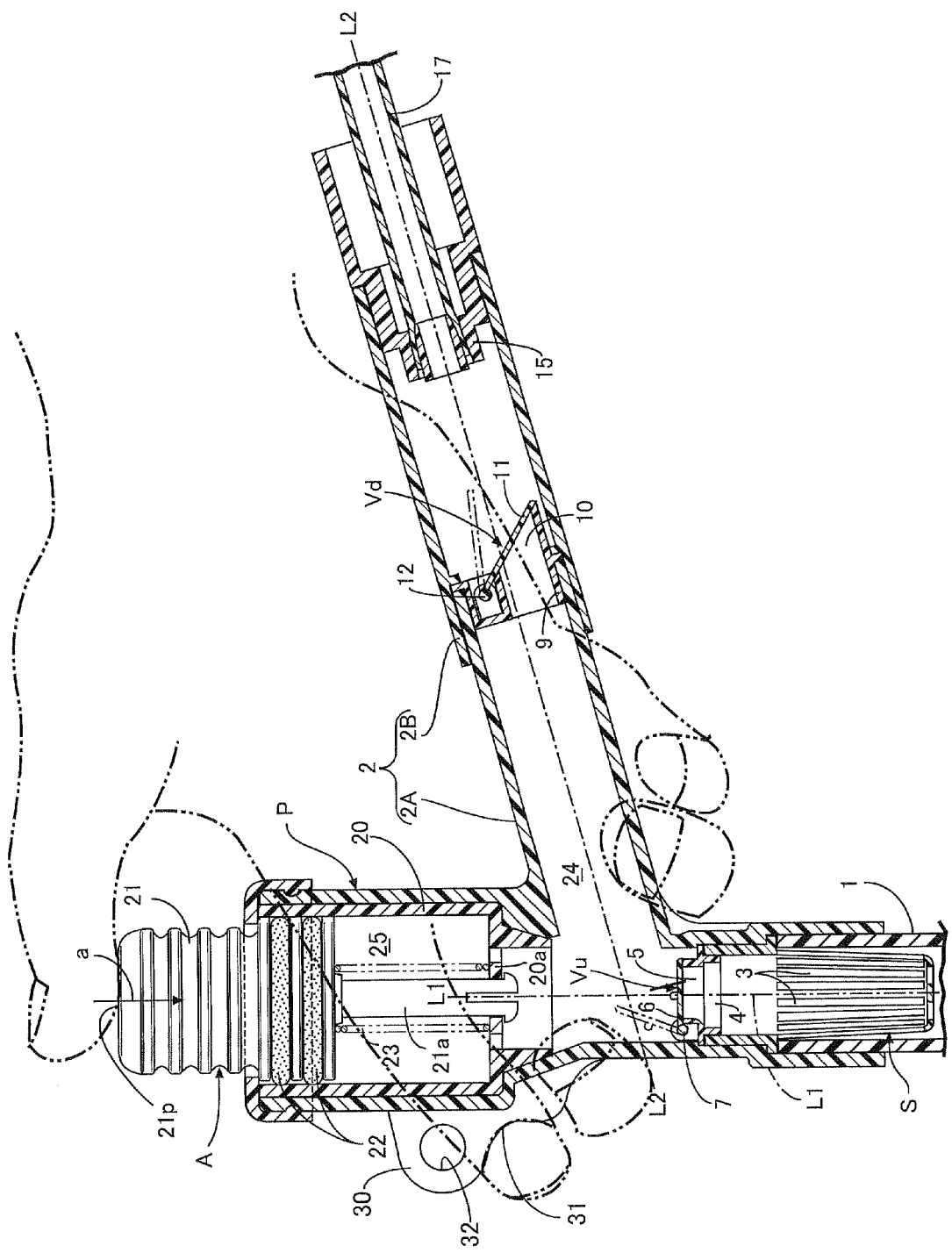
FIG. 9 is a vertical sectional side view of an essential part of a cleaner for the inside of a water tank (modified example of second embodiment).

A modified example of the second embodiment is now explained by reference to FIG. 9.

This modified example is a case in which a suction operation tool A having the same structure as that of the second embodiment is provided at the upper end of a linear main body portion 1 of a suction pipe P; an operation chamber 25 is at a position outside and above a water passage 24 of the suction pipe P, and the same operation and effects as those of the second embodiment can be exhibited.

Embodiments of the present invention are explained above, but the present invention is not limited to these embodiments, and various embodiments are possible within the scope of the present invention.

The invention claimed is:

1. A cleaner for the inside of a water tank in which water-tank water within the water tank is sucked up by a siphoning action and drained outside the water tank, the cleaner comprising:
    a suction pipe formed from a linear main body portion and a grip portion connected to the main body portion by a bent connecting part, wherein the linear main body portion has a length that, when used in the water tank, reaches a bottom of the water tank,
    a flexible water-guiding pipe connected to an outer end of the suction pipe,
    an upstream-side one-way valve provided at an appropriate place within the main body portion and permitting flow of water only in a direction from the suction pipe to the water-guiding pipe,
    a downstream-side one-way valve provided within the grip portion and permitting flow of water only in a direction from the suction pipe to the water-guiding pipe, and
    a suction operation tool provided in the bent connecting part between the linear main body portion and the grip portion and pressurizing or depressurizing an interior of a water passage between the upstream-side one-way valve and the downstream-side one-way valve,
    wherein the suction operation tool is provided integrally with the suction pipe at a position between the upstream-side one-way valve and the downstream-side one-way valve such that the suction operation tool is provided substantially parallel to the linear main body portion and an operational direction of the suction operation tool is substantially parallel with a central line of the linear main body portion and substantially coincides with a suction direction of water in the linear main body portion.

2. The cleaner for the inside of a water tank according to claim 1, wherein the suction operation tool is formed from an operation tube connected so as to communicate with the interior of the water passage and provided substantially parallel to the main body portion, a press button slidably fitted into the operation tube via a seal ring and having an outer end thereof projecting outside the operation tube, and a return spring provided within the operation tube and urging the press button toward the outside.

3. The cleaner of claim 1, wherein the flexible water-guiding pipe comprises at least one of a polymer and a transparent portion.

4. The cleaner of claim 1, wherein the flexible water-guiding pipe is connected to the suction pipe on an opposite side of the water tank.

5. The cleaner for the inside of a water tank according to claim 1, wherein the suction operation tool comprises an operation tube integrally formed on the suction pipe and a press member fitted into the operation tube for reciprocal movement toward and away from the suction pipe, the press member being capable of being pressed for movement toward the suction pipe by a finger of a hand of a user which hand grips said grip portion.

6. The cleaner for the inside of a water tank according to claim 1, wherein the bent connecting part is formed to have a fixed bent angle.

7. A cleaner for the inside of a water tank in which water-tank water within the water tank is sucked up by a siphoning action and drained outside the water tank, the cleaner comprising:
    a suction pipe formed from a linear main body portion and a grip portion connected to the main body portion by a bent connecting part, wherein the linear main body portion has a length that, when used in the water tank, reaches a bottom of the water tank,
    a flexible water-guiding pipe connected to an outer end of the suction pipe,
    an upstream-side one-way valve provided at an appropriate place within the main body portion and permitting flow of water only in a direction from the suction pipe to the water-guiding pipe,
    a downstream-side one-way valve provided within the grip portion and permitting flow of water only in a direction from the suction pipe to the water-guiding pipe, and
    a suction operation tool provided above the suction pipe and pressurizing or depressurizing an interior of a water passage between the upstream-side one-way valve and the downstream-side one-way valve,
    the suction operation tool being formed from an operation tube provided above an upper wall of the suction pipe and having an operation chamber positioned above the water passage within the suction pipe, and a press button slidably fitted into the operation chamber, wherein the suction operation tool is provided integrally with the suction pipe at a position between the upstream-side one-way valve and the downstream-side one-way valve such that the suction operation tool is fixed in a substantially parallel positional relation with respect to the linear main body portion and an operational direction of the suction operation tool is substantially parallel with a central line of the linear main body portion and substantially coincides with a suction direction of water in the linear main body portion.

8. The cleaner of claim 7, wherein the flexible water-guiding pipe comprises at least one of a polymer and a transparent portion.

9. The cleaner of claim 7, wherein the flexible water-guiding pipe is connected to the suction pipe on an opposite side of the water tank.

10. A cleaner for the inside of a water tank in which water-tank water within the water tank is sucked up by a siphoning action and drained outside the water tank, the cleaner comprising:

a suction pipe formed from a linear main body portion and a grip portion connected to the main body portion by a bent connecting part, wherein the linear main body portion has a length that, when used in the water tank, reaches a bottom of the water tank, a flexible water-guiding pipe connected to an outer end of the suction pipe, an upstream-side one-way valve provided at an appropriate place within the main body portion and permitting flow of water only in a direction from the suction pipe to the water-guiding pipe, a downstream-side one-way valve provided within the grip portion and permitting flow of water only in a direction from the suction pipe to the water-guiding pipe, and a suction operation tool provided above the suction pipe and pressurizing or depressurizing an interior of a water passage between the upstream-side one-way valve and the downstream-side one-way valve, the suction operation tool comprises an operation tube integrally formed on the suction pipe at a position above an upper wall of the suction pipe so as to project above the suction pipe, and a press member fitted into the operation tube for reciprocal movement toward and away from the suction pipe, the press member being capable of being pressed for movement toward the suction pipe by a finger of a hand of a user which hand grips said grip portion, wherein the suction operation tool is provided integrally with the suction pipe at a position between the upstream-side one-way valve and the downstream-side one-way valve such that the suction operation tool is fixed in a substantially parallel positional relation with respect to the linear main body portion and an operational direction of the suction operation tool is substantially parallel with a central line of the linear main body portion and substantially coincides with a suction direction of water in the linear main body portion.

11. The cleaner for the inside of a water tank according to claim 10, wherein the bent connecting part is formed to have a fixed bent angle.

\* \* \* \* \*